(12) United States Patent
Skubacz et al.

(10) Patent No.: US 8,239,189 B2
(45) Date of Patent: Aug. 7, 2012

(54) METHOD AND SYSTEM FOR ESTIMATING A SENTIMENT FOR AN ENTITY

(75) Inventors: Michal Skubacz, Gröbenzell (DE);
Peter Suda, München (DE);
Cai-Nicolas Ziegler, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 969 days.

(21) Appl. No.: 12/023,085

(22) Filed: Feb. 26, 2008

(65) Prior Publication Data
US 2009/0216524 A1  Aug. 27, 2009

(51) Int. Cl.
G06F 17/27 (2006.01)
G06F 17/28 (2006.01)
G06F 17/30 (2006.01)

(52) U.S. Cl. ....... 704/9; 704/10; 704/8; 704/7; 704/231; 704/251

(58) Field of Classification Search ................ 704/1–10
See application file for complete search history.

(56) References Cited

U.S. PATENT DOCUMENTS

| | | | | |
|---|---|---|---|---|
| 5,970,492 A * | 10/1999 | Nielsen | | 1/1 |
| 6,622,140 B1 * | 9/2003 | Kantrowitz | | 1/1 |
| 6,757,362 B1 * | 6/2004 | Cooper et al. | | 379/88.01 |
| 7,523,085 B2 * | 4/2009 | Nigam et al. | | 706/55 |
| 7,983,910 B2 * | 7/2011 | Subramanian et al. | | 704/250 |
| 2002/0029203 A1 * | 3/2002 | Pelland et al. | | 706/12 |
| 2005/0091038 A1 * | 4/2005 | Yi et al. | | 704/10 |
| 2005/0125216 A1 * | 6/2005 | Chitrapura et al. | | 704/1 |
| 2006/0069589 A1 * | 3/2006 | Nigam et al. | | 705/1 |
| 2006/0129927 A1 * | 6/2006 | Matsukawa | | 715/532 |
| 2006/0200341 A1 * | 9/2006 | Corston-Oliver et al. | | 704/5 |
| 2006/0200342 A1 * | 9/2006 | Corston-Oliver et al. | | 704/10 |
| 2007/0198249 A1 * | 8/2007 | Adachi et al. | | 704/9 |
| 2007/0255553 A1 * | 11/2007 | Nomoto | | 704/9 |
| 2008/0005051 A1 * | 1/2008 | Turner et al. | | 706/20 |
| 2008/0249764 A1 * | 10/2008 | Huang et al. | | 704/9 |
| 2008/0270116 A1 * | 10/2008 | Godbole et al. | | 704/9 |
| 2009/0193011 A1 * | 7/2009 | Blair-Goldensohn et al. | | 707/5 |
| 2009/0316862 A1 * | 12/2009 | Sugimoto et al. | | 379/88.01 |
| 2010/0023311 A1 * | 1/2010 | Subrahmanian et al. | | 704/2 |

* cited by examiner

*Primary Examiner* — Richemond Dorvil
*Assistant Examiner* — Abdelali Serrou

(57) ABSTRACT

A method for estimating a sentiment conveyed by the content of information sources towards an entity is presented. The sentiment is obtained with respect to a query context that may be specified, e. g. by specific terms or expressions, like a product or service name. A sentiment dictionary having a plurality of sentiment terms is provided, wherein each sentiment term has assigned a sentiment value, and at least one of said sentiment terms is associated to a group context. Text documents are screened for occurrences of sentiment terms that are associated to a group context corresponding to the query context. Calculating a sentiment score value is performed as a function of the occurrences of sentiment terms having a similar or same group context as the query context. The method may be carried out automatically without manual analysis of the actual semantic content of the text documents under consideration.

15 Claims, 7 Drawing Sheets

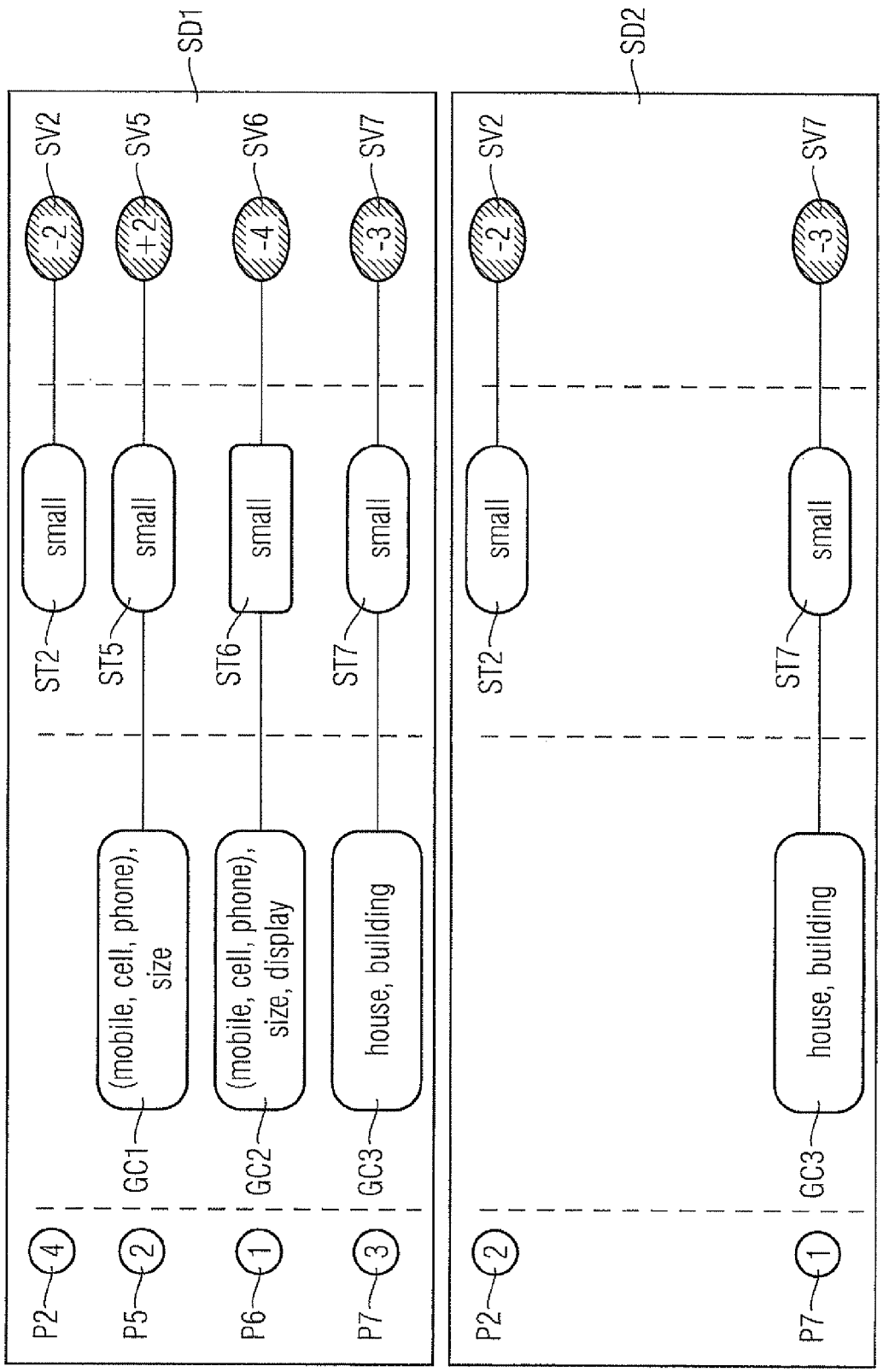

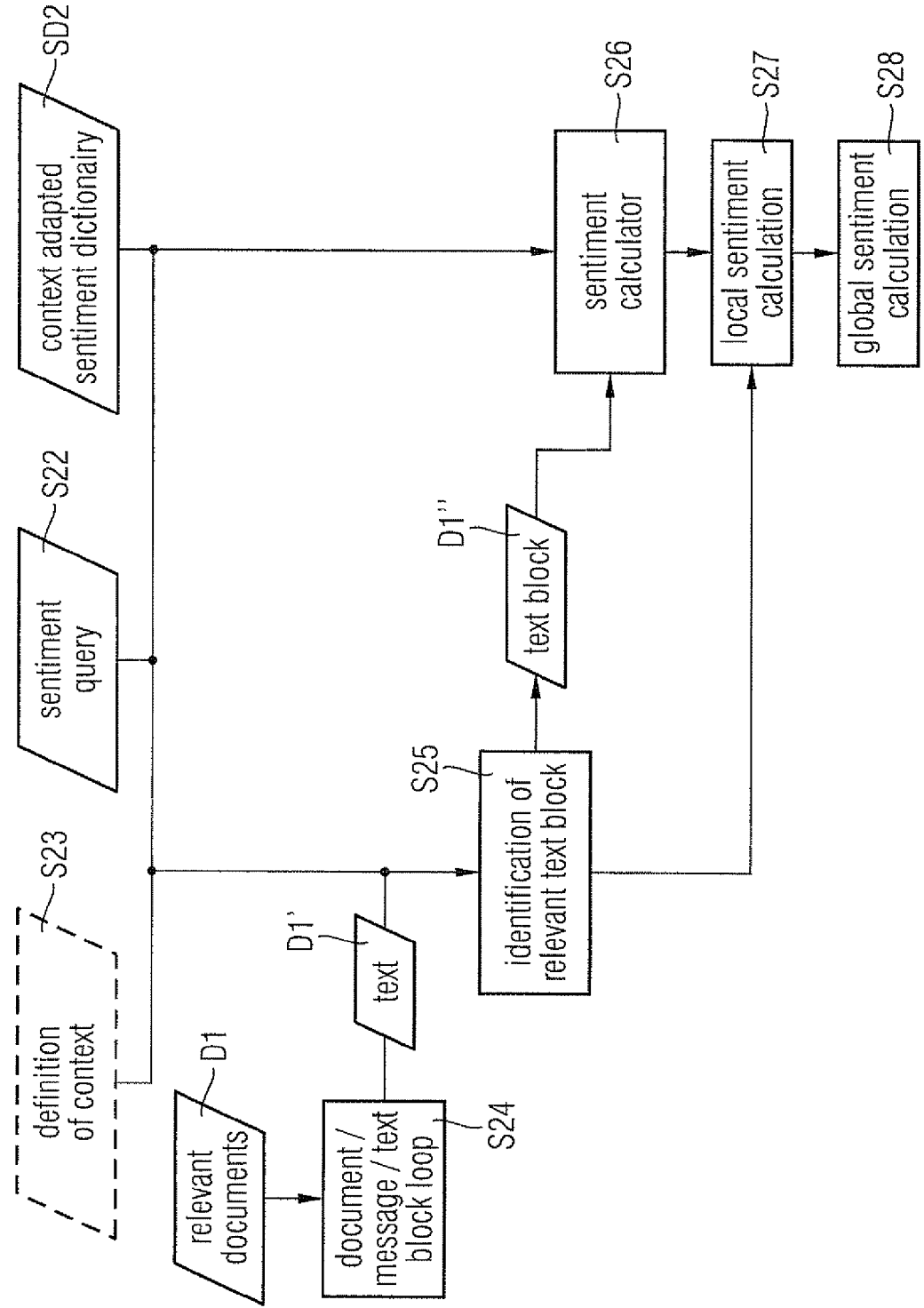

METHOD AND SYSTEM FOR ESTIMATING A SENTIMENT FOR AN ENTITY

BACKGROUND OF THE INVENTION

The invention relates to methods for estimating a sentiment for an entity and systems for performing such methods.

Sentiments or emotions may be expressed in terms of text documents, such as newspaper articles, speeches, blog entries or contributions in the internet. For example, due to the increasing adoption of Web 2.0 technologies the influence and amount of such information distributed through the internet may grow. As a consequence more and more information is published by organizations, analysts, news agencies and individuals.

On the one hand the contemporary information flow constitutes a thread and on the other hand an opportunity for marketing, communication or customer relation ship departments of businesses. However, due to the huge amount of information, for example internet published web documents, the extraction of a sentiment or tracking of opinions towards a particular entity, as for example a large corporation, is virtually unfeasible using conventional methods. However, it is sometimes desirable to obtain an overall opinion or sentiment that is maintained in one ore more text documents. Conventionally, a detailed manual examination of those documents is necessary.

SUMMARY OF THE INVENTION

The disclosure presents methods and apparatuses for estimating a sentiment or emotional content with respect to an entity. Specifically, a sentiment dictionary is provided holding a plurality of sentiment terms wherein each sentiment term has assigned a sentiment value. At least one of sentiment terms is associated to a group context. A sentiment score value, for example regarding a specified context, is calculated by screening text documents for occurrences of sentiment terms that are associated to a group context corresponding to a query context. The calculation of the sentiment score value may be performed as a function of an occurrence of sentiment terms being associated to a group context corresponding to the query context and the match of a context of said text document with a query context.

The disclosure further presents a method for building a sentiment dictionary that may be employed for estimating a sentiment score value for an entity. Specifically, a plurality of sentiment terms is provided. The sentiment terms are classified into groups wherein a group has a common associated group context, and sentiment values are assigned to each sentiment term as a function of the group context.

A system for estimating a sentiment for an entity comprises a storage means for storing a sentiment dictionary having a plurality of sentiment terms. Each sentiment term has assigned a sentiment value, and at least one of said sentiment terms is associated to a group context having a group context identifier. The group context identifier comprises at least one character string. The system has an input means for inputting a query context identifier. The query context identifier comprises at least one character string. The system has a text retrieving means communicatively coupled to an information space for retrieving at least one text document. And the system comprises a processing platform for screening the retrieved text document for determining occurrences of sentiment terms in said text document and for calculating a sentiment score value. The sentiment score value is obtained as a function of score values of sentiment terms occurring in said text documents and as a function of a similarity measure between the group context identifiers of the occurred sentiment terms and the query context identifier.

BRIEF DESCRIPTION OF THE DRAWINGS

In the following aspects and embodiments of the invention are described with respect to the figures in the drawings.

FIG. 6 shows an illustration of a second alternative of a sentiment dictionary; and FIG. 7 shows a flow chart of a fourth alternative of a method for estimating a sentiment.

DETAILED DESCRIPTION OF EMBODIMENTS OF THE INVENTION

Often a collection of documents or text descriptions relate to a particular topic or subject. For example blog entries may relate to the name of a company or corporation as "Siemens AG". It is then desirable to obtain or detect the sentiment conveyed through those text descriptions. For example, a marketing department may be interested in an automatically calculated sentiment towards the entity Siemens which is identified by the name "Siemens" based on a sentence extracted from a blog's entry. An exemplary expression like "Lots of things had happened at Siemens and not all of it good. The bribing scandal has only added to this picture". A manual analysis by an observer of these sentences will conclude that the author's attitude towards Siemens is rather negative.

Sentiment detection is a very complex matter and cannot always be solved easily since the notion of feelings and attitudes belongs to more typological or philosophical research than to strict mathematics or automatic feature extraction. It is specifically a problem that deciding on a sentiment of a particular text can only be treated as an approximation since it is a very subjective measure: two human beings may differ on their assessment and interpretation of the same text.

The proposed methods and system for sentiment estimation employ the fact that the expression of sentiment occurs in different ways depending on the context of the information. For example, the adjectives "small" conveys a positive emotion or sentiment when referring to a mobile phone, but "small" conveys a negative connotation when describing a building or house. This illustrates that explicitly given sentiment dictionaries merely consisting of lists of words or terms plus a positive or negative sentiment value may be inappropriate.

Conventional approaches for evaluating an overall sentiment of a text can also be based on statistics and machine learning, natural language processing, techniques or other. Natural language processing for example performs sentence structure analysis and detects syntactic characteristics that have an impact on polarity and semantics as for example a contextual valance shifting through negation or intensification. However, the detection of conditionals, concessive clauses etc. requires a considerable computational effort.

Other situations where sentiments are exchanged are for example internet portals, or news groups where an exchange of opinions takes place between several parties. In those news groups particular topics or contacts have to be predefined and therefore an analysis is subject to strong limitations.

In this disclosure, an approach for sentiment estimation is disclosed that incorporates context information in the detection process when automatically analyzing text material.

Figure 1:
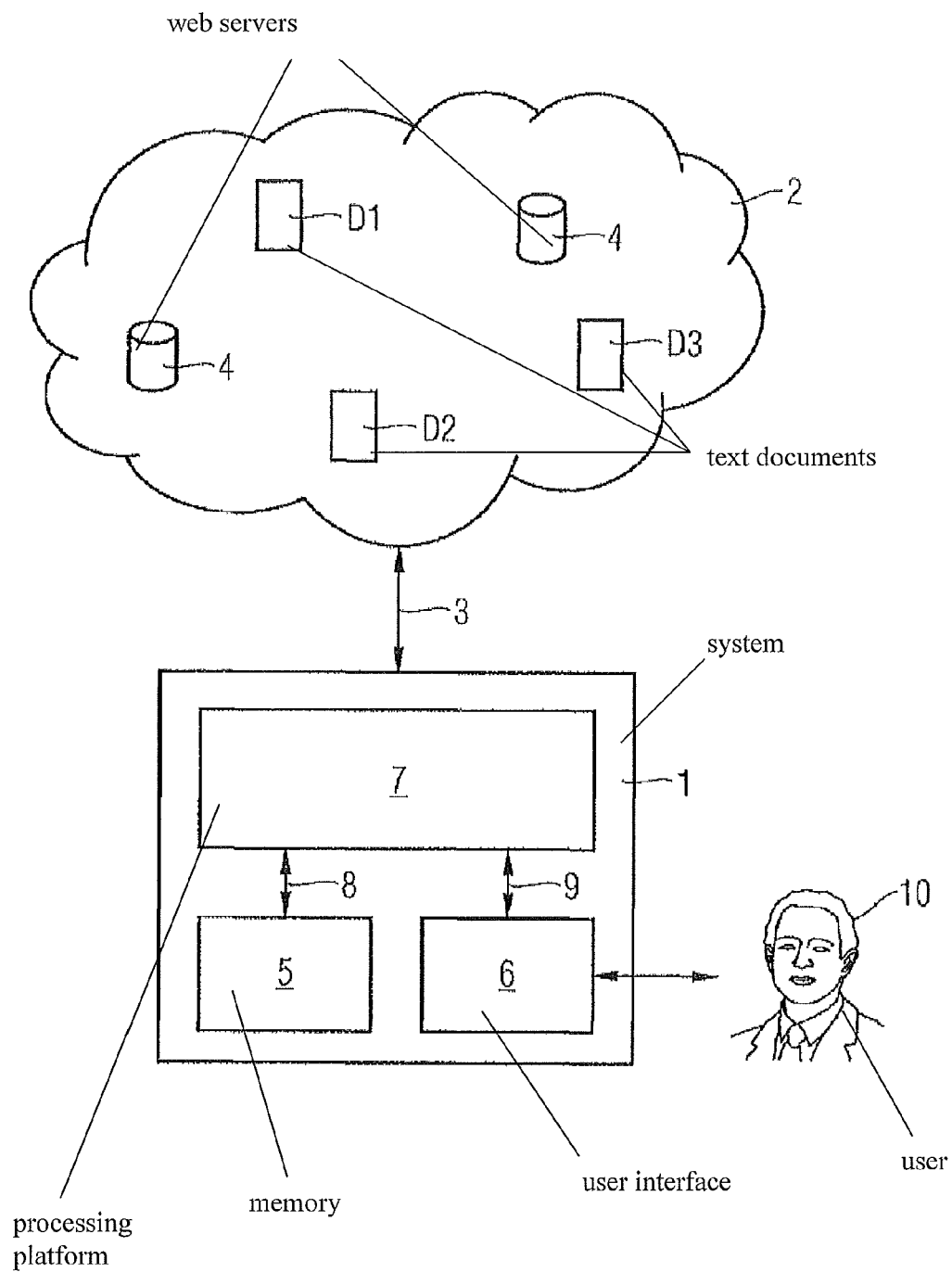
FIG. 1 shows a schematic diagram of an embodiment for a system for estimating a sentiment.

FIG. 1 shows a system for estimating a sentiment for an entity that may be adopted to perform a method as explained below. The system for estimating a sentiment 1, for example, can be implemented as a computer program or as a programmable computer. The system 1 comprises a processing platform 7 which is coupled to a storage means that has a dedicated memory 5 and to a user interface 6. The coupling is indicated through arrows 8 and 9. The system for sentiment estimation 1 is communicatively coupled 3 to an information space 2.

The information space 2, for example, can be the internet and comprises web servers 4 providing text documents D1, D2, D3. An information space can also be formed by other means, as for example a collection of books, articles, registered voice mail messages, radio transmissions or other concepts of information. The available text documents D1, D2, D3 can also be obtained through speech recognizing audio messages or spoken texts.

The memory 5 contains, for example, a sentiment dictionary which is further explicated below. The user interface 6 allows users 10, for example, to input sentiment queries or to change the sentiment dictionary. The sentiment estimation is usually applied to assess emotion towards a particular subject or entity in a particular context. The entity, for example may be a company, a corporation, a product, a person or other objects. Additionally, the context can be an abstract concept, as for example the weather, the topic of a debate, or a prestige of a company. The entity, for example, can be defined in terms of an entity identifier that can correspond to a name or denomination as is "Siemens" for a company.

The processing platform 7 retrieves relevant documents D1, D2, D3 from the information space 2 and analyzes them as a function of a query context and a denomination of the entity for which a sentiment is to be estimated. The query context defines the subject of the query and may comprise parameters limiting the scope of the analysis, as for example the source type of the analyzed documents or the time of their creation. For example, documents that are older than a certain age are not considered in analyzing an estimate of the contained sentiment. The estimation is based on a sentiment dictionary stored in the memory 5.

Figure 2:
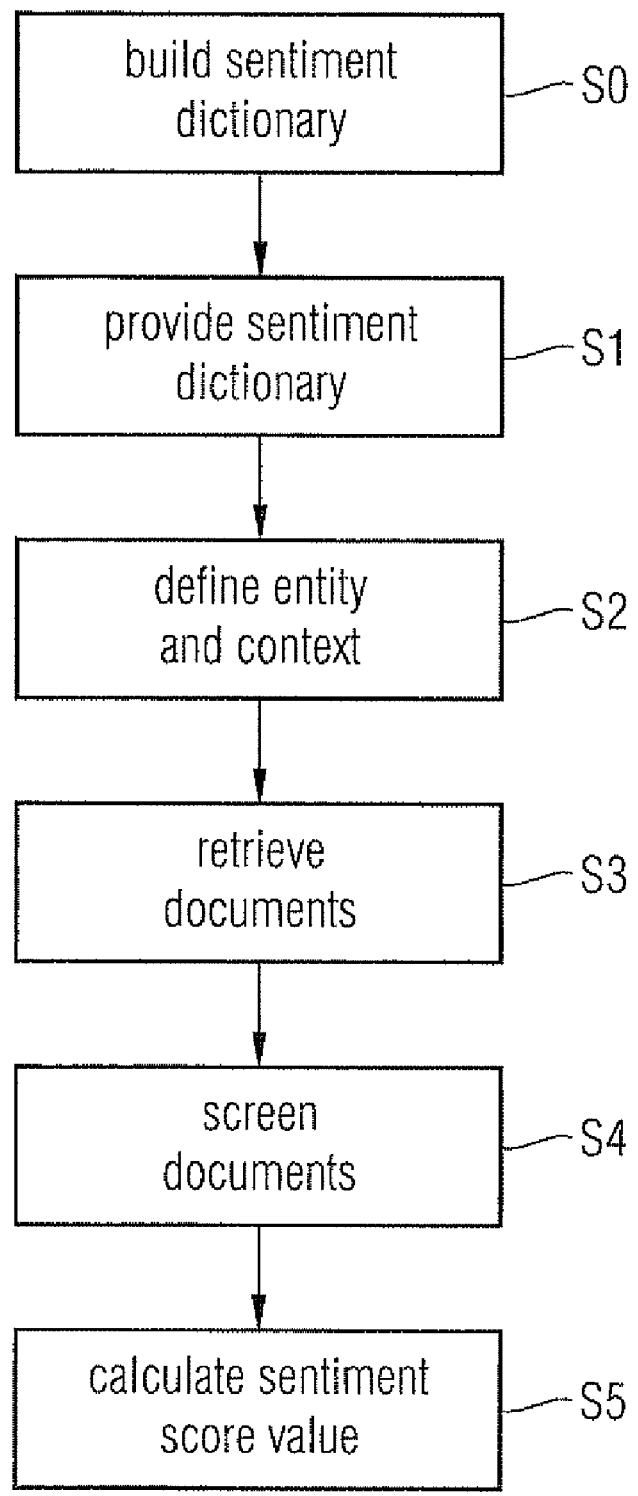
FIG. 2 shows a flow chart of a first alternative of a method for estimating a sentiment.

FIG. 2 shows one embodiment of a method for estimating a sentiment for an entity. The method steps S0-S5 are, for example, carried out by the processing platform 5 in a system 1 as shown in FIG. 1.

First, in the optional step S0 a sentiment directory is built. An exemplary sentiment directory is, for example, illustrated in FIG. 3. The sentiment directory SD comprises a plurality of sentiment terms ST1-ST8. Those terms, for example, can be obtained through browsing sample texts and extracting the occurring adjectives. Adjectives usually have a positive or negative connotation and are therefore potentially appropriate for sentiment detection.

Figure 3:
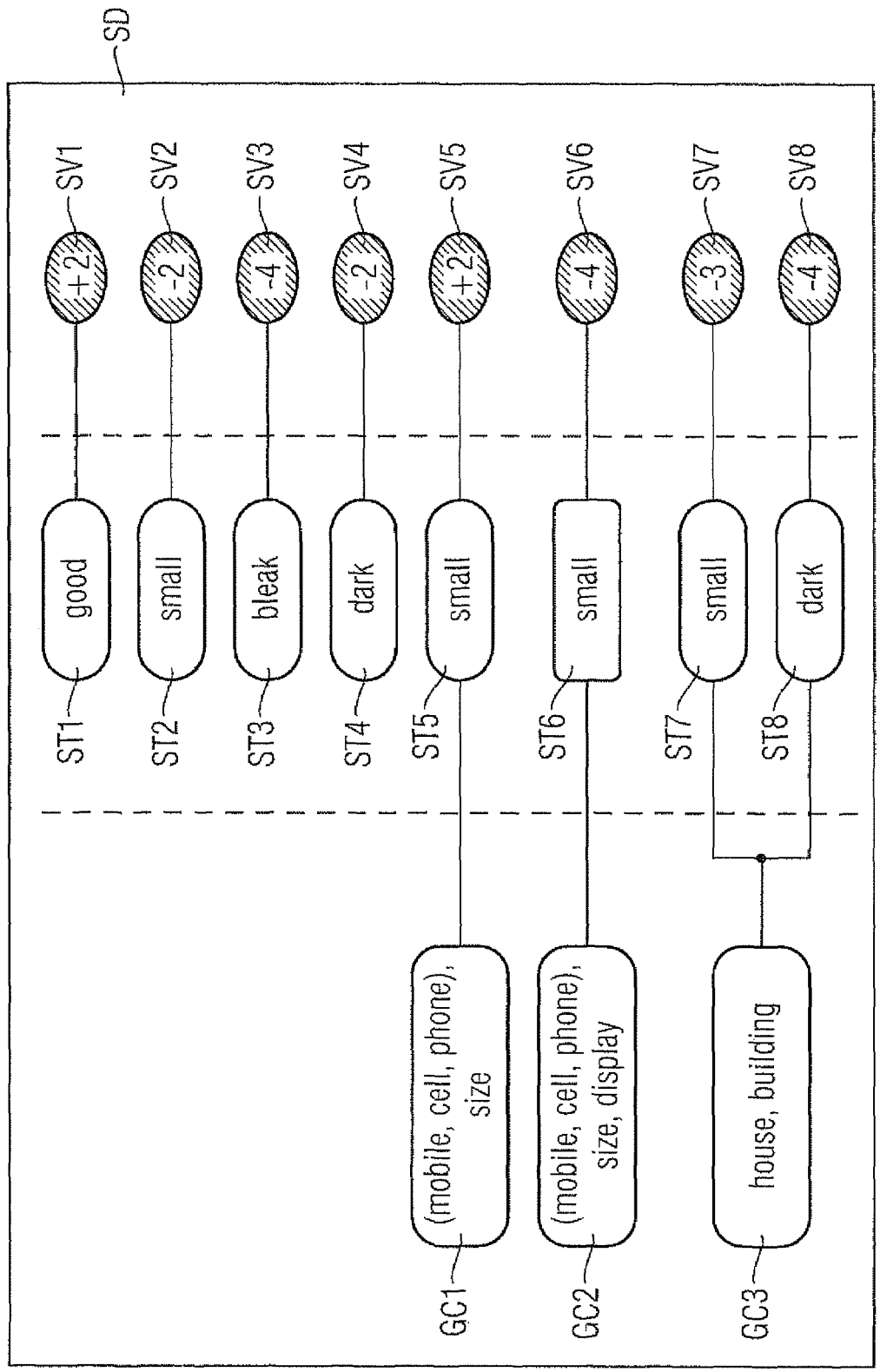
FIG. 3 shows an illustration of a first alternative of a sentiment dictionary.

FIG. 3 shows, for example, sentiment terms "good", "small", "bleak", "dark". The first sentiment terms ST1-ST4 are individual sentiment terms. However, the sentiment terms ST5, ST6 and ST7 and ST8 are classified into groups. The sentiment term ST5="small" forms one group that has an associated group context GC1. The group context specifies a particular circumstance. Context can be considered the language or expressions accompanying a particular word or phrase that influences its meaning or effect with respect to the sentiment. The context "mobile phone" and "size", for example, leads to a positive connotation of the sentiment term "small".

On the other hand the sentiment term ST6="small" forms a context group GC2 that is characterized by a "mobile phone", its "size" and its "display". For the display of a mobile phone the adjective "small" carries a rather negative sentiment. Additionally, the sentiment terms ST7="small" and ST8="dark" are classified in a third group GC3 that is characterized by a context group identifier "house, building". In the context of houses or buildings "small" and/or "dark" is quite negative.

The sentiments that may be expressed by the sentiment terms ST1-ST8 are reflected through sentiment values SV1-SV8 that are assigned to each sentiment term ST1-ST8. For example, the sentiment term ST1="good" without any further specified context has a positive meaning. Therefore, a sentiment value SV1=+2 is assigned. However, in the context of the size of a display of a mobile phone (GC2) the sentiment term ST6="small" is usually considered negative. Therefore, the corresponding sentiment value SV6=−4 is assigned. For example, a scale from −5 (negative) to 5 (positive) can be used.

The sentiment dictionary SD as shown in FIG. 3 can be implemented as a relational data base but also by other appropriate data structures. In FIG. 3 the relations between sentiment terms ST1-ST8 and the sentiment values SV1-SV8, as well as the relations between the group contexts GC1-GC3 and the sentiment terms ST5-ST8 are illustrated by the horizontal solid lines.

In the example of FIG. 3 sentiment values between −5 (extremely negative) and +5 (extremely positive) are assigned to the sentiment terms ST1-ST8. The corresponding group context GC1-GC3, for example, can be represented by n-grams or unigrams. An n-gram is a subsequence of n items wherein the items, for example, can be words or character strings. The use of n-grams is prominent in statistical natural language processing and genetic sequence analysis. The sentiment terms ST1-ST8 are for example one-grams or monograms.

The creation and maintenance of the sentiment dictionary SD can be supported by the user interface 6. The interface 6 allows users 10 to insert sentiment terms assign or tag sentiment values and define contexts for the sentiment terms.

Optionally, the sentiment terms may have a processing priority depending on the selectiveness of the group context. For example, the group context GC1 that is characterized by two terms, i. e. by the synonyms "mobile" or "cell" or "phone" plus "size", has a lower selectiveness than the group context GC2 that is characterized by three words: one of the synonyms "mobile" or "cell" or "phone" plus "size" plus "display". Hence, when a sentiment term "small" is detected in a text and can be recognized in connection with the context GC2 the corresponding sentiment value SV6 prevails over the sentiment value SV5 of the same expression "small" in connection with the context GC1.

For building and maintaining the sentiment dictionary the sentiment dictionary may be available to plurality of users who share and develop a common sentiment dictionary. For example, all users can undertake changes in the sentiment dictionary for their common profit, and in case of disputes when users differ on the tagging of sentiment values to sentiment terms a voting or averaging process can be applied. Candidate sentiment terms for insertion into the sentiment dictionary can be obtained by analyzing sample texts and detecting, for example, adjectives or extracting frequently collocated words or common terms and already sentiment labeled documents. Then the candidate terms can be tagged with sentiment values and associated to certain group contexts by the users.

Referring back to FIG. 2, in step S1 the sentiment dictionary is provided. A dictionary, for example, can be provided by a memory in a corresponding system 1 as shown in FIG. 1.

In the next step S2 the entity under consideration and the query context is specified. This can be done through the user interface 6 by the user submitting the sentiment query. The entity usually is defined by denominations such as a company name comprising a character string, e.g. "Siemens". The context specified by the user, for example, limits the query to particular abstract concepts relating to the entity. For example, "industry", "automation", "controller", "medical x-ray" and so forth may relate to Siemens. A context can be represented by a context identifier based on relationally coupled expression or character strings.

In a next step S3 documents corresponding to the query context are retrieved from the information space. This can be an internet web page, blog entries, and a collection of documents or other text-based information.

In step S4 those retrieved documents are screened and searched for sentiment terms. If a sentiment term occurs in the text screening involves also checking whether query context identifiers or group context identifiers are close to the sentiment term in the text. If, for example, in a text portion the sentiment term "small" appears it is checked whether in a textual vicinity of "small", "size" and "mobile" or "cell" or "phone" appears. If so according to the sentiment dictionary, the corresponding score value SV5 is saved. Preferably, only those score values are saved that correspond to sentiment terms being associated to context groups having a high selectiveness.

After screening the documents in step S4 a sentiment score value for the sentiment query is calculated in step S5. This can be done by summing the memorized score values during the screening process in step S4. As a result, one obtains a score value indicating a positive or negative sentiment conveyed through the screened text documents. Employing the sentiment dictionary shown in FIG. 3 the higher the score value the better is the sentiment towards the entity.

Figure 4:
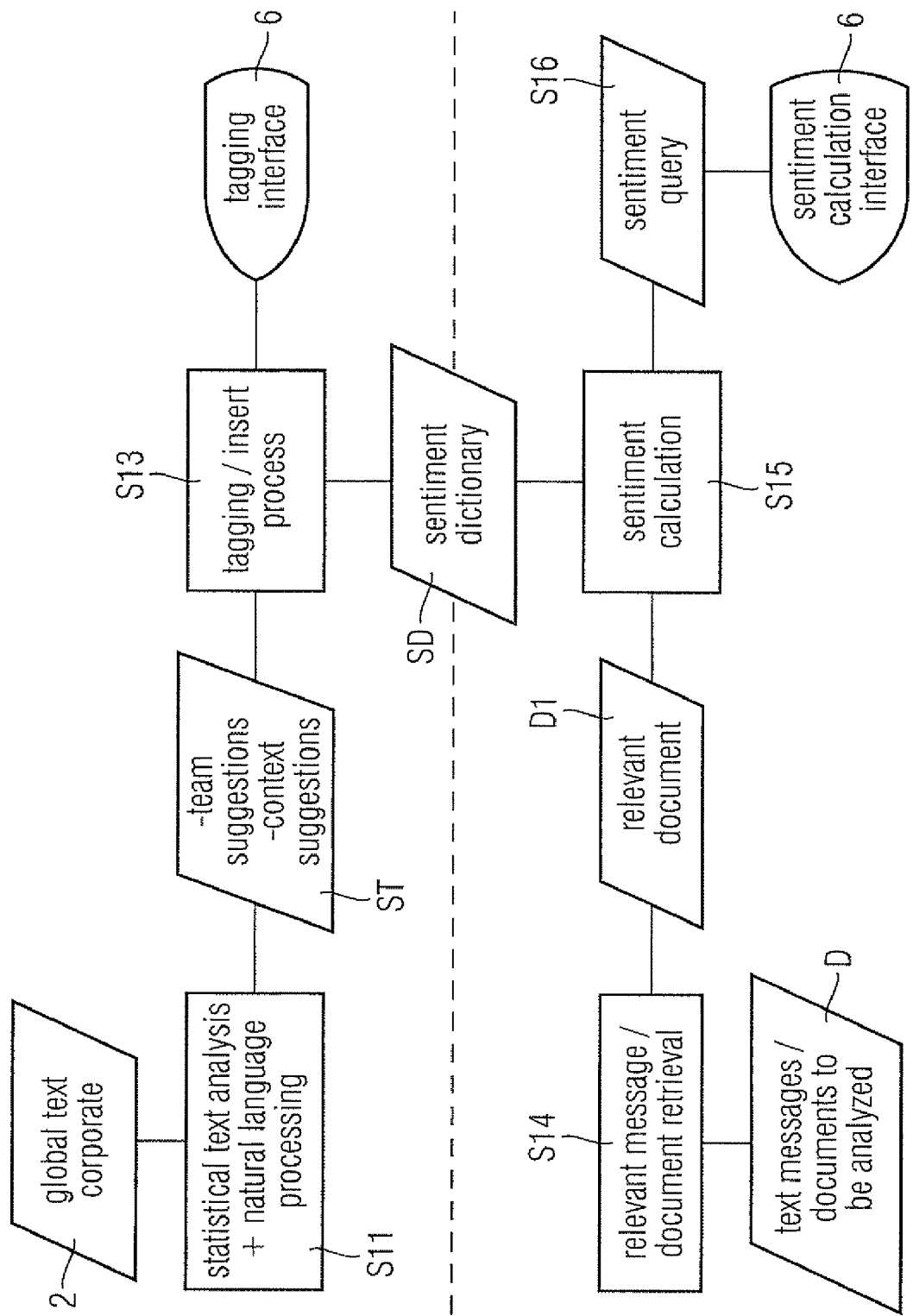
FIG. 4 shows a flow chart of a second alternative of a method for estimating a sentiment.

FIG. 4 shows an alternative of a method for estimating the sentiment towards an entity. The upper half of FIG. 4 which is separated by the dashed line from the lower part relates to the creation and refinement of the sentiment dictionary. The lower part of FIG. 4 relates to the sentiment calculation. The boxes shown in FIG. 4 either relate to method steps or appropriate means such as computer program modules performing such method steps.

First, global text corpora 2, as for example, provided through the internet are given. Then a statistical text analysis and optionally natural language processing is performed (step S11) to obtain sentiment term suggestions and context suggestions that are proposed to users. The statistical text analysis S11 for example comprises extracting paragraphs or sentences from a raw text document. The term suggestions and context suggestions ST may be obtained more or less automatically. For example in step S11 adjectives are retrieved and detected in the texts. Then, the textual vicinity of those adjectives is analyzed for words or expressions that may suffice to characterize a specific context. For example a sentence containing the adjectives "small" as well as context describing expressions like "house" or "building" or "room" can be provided to the users for sentiment value tagging.

A tagging interface 6 is provided that may correspond to the user interface 6 as shown in FIG. 1. Preferably, a plurality of users performs the assignment of score values to the proposed sentiment terms and the association to certain context groups. As a result, the sentiment dictionary SD is created.

If now a sentiment query is submitted, for example, through a dedicated sentiment calculation interface 6 that can be the user interface 6 as shown in FIG. 1. Then an estimation with respect to the sentiment conveyed in certain text documents with respect to an entity and a query context is performed. For sentiment calculation S15, first a pool of text messages or documents D1 to be analyzed is provided. According to the query context, for example the entity is "Siemens" and a context is "automation" only documents corresponding to automation are provided for further analyses in step S14. The sentiment calculation unit or process step S15 retrieves those relevant documents D1 and calculates a sentiment score value as a function of the occurrences of sentiment terms listed in the sentiment dictionary SD in the relevant document D1. The sentiment calculation unit S15 or a corresponding method step may comprise displaying the calculated sentiment estimate in terms of the sentiment score value.

The method for estimating a sentiment can be altered for recognizing also the selectiveness of certain group contexts and the relevant sentiment terms. This is shown in a flow chart for an alternative embodiment of a method for estimating a sentiment through an entity. In an initial step S17 the sentiment query is defined for example by the name of a company or product like "Sematic". Additionally, a date or time period for which the sentiment estimate is desired can be specified. Next, the definition of the context for the query is given in S18. For example, the terms "automation", "industry" and "controller" sufficiently characterize the context of the query. This means, it is desired to have a sentiment conveyed by certain text documents for the entity "Sematic" as a product in connection with "industry automation controllers".

As a function of the context that can be identified by the terms "automation", "industry" and "controller" an initial sentiment directory SD1 is changed or optimized to a context adapted sentiment dictionary SD2. The changing S19 of the sentiment dictionary SD1 to an optimized sentiment dictionary SD2 is done as a function of the query context. This process is illustrated in more detail in FIG. 6. FIG. 6 shows an initial sentiment dictionary SD1 comprising sentiment terms ST2, ST5, ST6, ST7 having assigned sentiment values SV2, SV5, SV6, SV7. The sentiment terms ST5, ST6, ST7 are associated to context groups GC1, GC2, GC3.

Depending on the selectiveness of the context groups GC1, GC2, GC3 priority values P2, P5, P6, P7 are assigned to the context groups GC1, GC2, GC3. Since GC2 is the most specific one, P6=1 has the highest priority. This means, if the sentiment terms ST6="small" appears in a text document in connection with the context GC2 the corresponding sentiment value SV6=−4 is memorized and finally summed up to calculate the sentiment score value even if "small" occurs as sentiment terms ST2, ST5 or ST7 in connection with other group contexts GC1, GC3.

If however, the query context corresponds to "house" or "building" an optimization of the sentiment dictionary is carried out. As a result, a context adapted sentiment dictionary SD2 is created wherein the context groups, sentiment terms and sentiment values are deleted that do not correspond to the query context. If as an example, the query context relates to houses and buildings, entries corresponding to GC1, GC2 relating to mobile phones are cancelled. As a result, the sentiment dictionary is reduced to ST2 and ST7 wherein ST7 relating to the context of houses and buildings GC3 has the highest priority P7=1 and the general sentiment term ST2 "small" which is not connected to any context has the priority P2=2. It is assumed that one corresponds to the highest priority.

Figure 5:
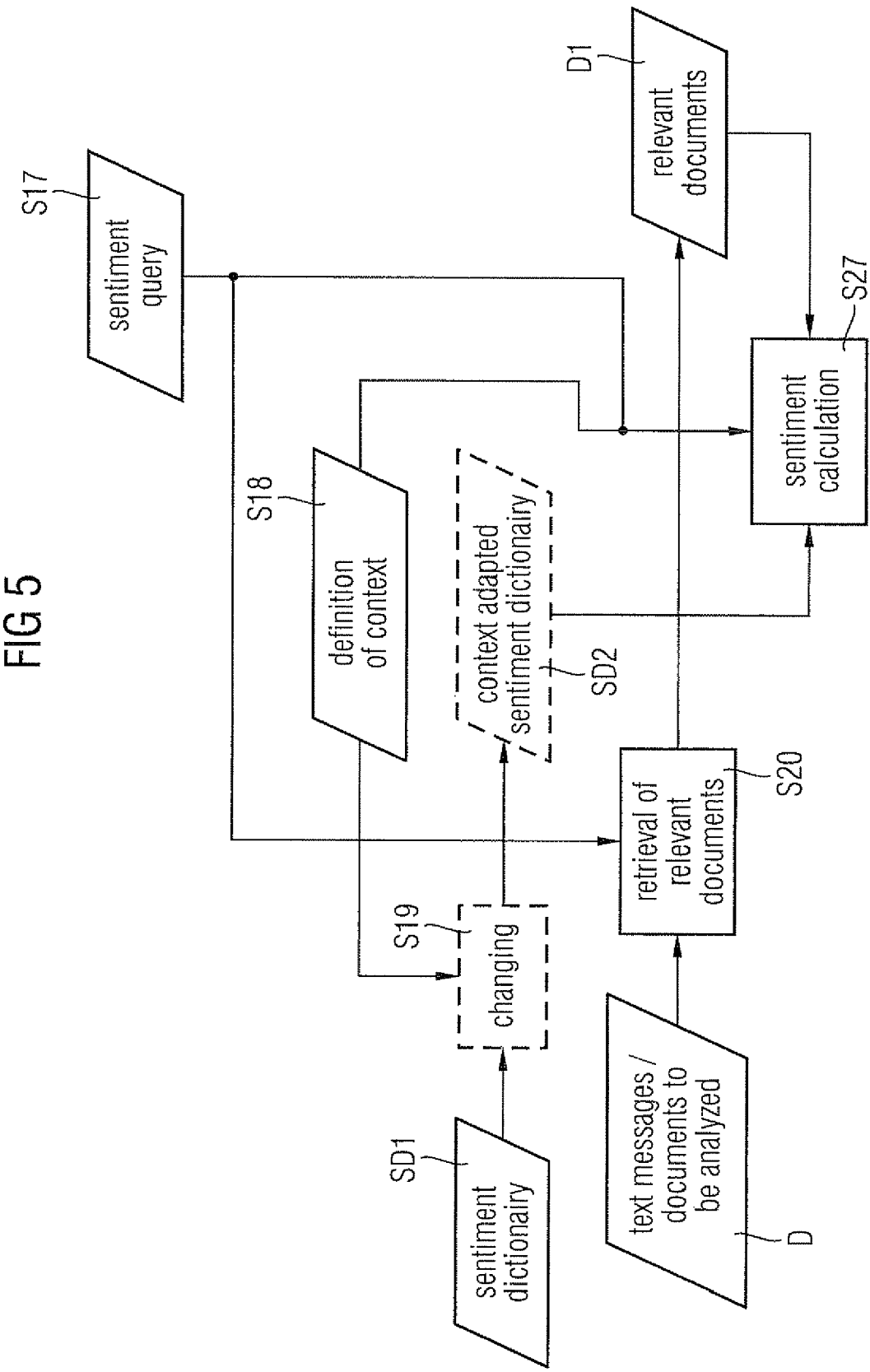
FIG. 5 shows a flow chart of a third alternative of a method for estimating a sentiment.

Turning back to FIG. 5, in step S20 the relevant documents are retrieved from the pool of text messages or documents D. Those relevant documents D1 are employed in the sentiment calculation unit or sentiment calculation step S21 as a function of the query context from S18 and the context adapted sentiment dictionary SD2. The relevant text documents can be processed either on the document or text block level. The sentiment calculation involves aggregating the sentiment values and their summation for obtaining the actual sentiment score value for the sentiment query. The text documents can be split into text blocks, for example, into paragraphs, and each paragraph is recognized with a specified number of score values for the sentiment terms occurring in the paragraph.

The score values can be weighted as a function of the relevance of the text block or paragraph wherein the relevancy of the text blocks is high if the query context is similar to the context of the text block. As an example, the relevance can be assumed by portional to the textual distance between the words or blocks to the query subject, i.e. the denomination of the entity mentioned in the text. Other relevance estimates may consider the occurrence frequency of the context defining or characterizing terms and optional include the distance to their occurrence within one text or text block.

During the sentiment calculation in step S21 or the sentiment calculation unit S21 that may be implemented through the processing platform 7 as shown in FIG. 1 instead of using constant sentiment values per sentiment term a best matching entry in the dictionary based on the match of the associated context to the entry of the content of the analyzed document is employed. Always the best match only is used as illustrated in FIG. 6 with respect to the optimized sentiment dictionary SD2. In a modified alternative of the method for estimating a sentiment, local sentiment estimates for text portions in the documents are calculated and finally summed up for obtaining an overall sentiment score value.

FIG. 7 shows yet another exemplary flow chart for an alternative embodiment of the method. According to the alternative embodiment in an input stage of the method first, the sentiment query is specified in step S22. This is similar to step S17 as shown and explained in FIG. 5. Further, the context is defined in step S23 and a context adapted sentiment dictionary SD2 is provided.

Relevant data in terms of documents D1 are accessible for example in an information space. For example, document D1 is now split into documents or message blocks in step S24. As a result, text portions D1' are examined independently. In step S25 a relevant text block in text D1' is identified, for example, because the entity identifier or denomination occurs in this text block. If the text block matches with the sentiment query a high relevance is assigned to that text block. The classified text block in step S25 is then subject to the sentiment calculation S26 leading to a local sentiment score value. The local sentiment calculation, for example, can occur as a function of the occurrence of a sentiment term belonging to the most specific group context, a textual distance, i.e. the number of words between the entity and denominator and context identifiers or the match of the context specifications from the query and context characterizing expressions in the text block.

After calculating the local sentiment score values for the extracted text blocks D1" in step S27 the global sentiment score value is calculated in step S38. The local sentiment score values are also calculated as a function of the relevance of the single text blocks. The global sentiment calculation in step S28, for example, can be done by summing up all local sentiment score values.

This disclosure provides for an automatic calculation of context dependence sentiments in document collections. This involves creating a sentiment dictionary including context information. Lists of candidates for sentiment terms can be created automatically and eventually submitted to social or user tagging for creating the sentiment dictionaries. The sentiment dictionaries are pruned or reordered as a function of user-defined sentiment queries and in particular as a function of a query context. An estimate for a sentiment for an entity with respect to a collection of documents is then based on the context information and provided as a function of a match of the documents or text portions with the query context and entries in the sentiment dictionary.

Some of the above described embodiments have advantages over conventional approaches for estimating sentiments because estimating occurs fully automatic. The methods may be applied to a variety of real raw data and can be processed by an adapted general purpose information analysis system.

The invention claimed is:
1. A method for estimating a sentiment for an entity named in a search query, the method comprising:
providing a system having a user interface, non-transitory memory, and a processing platform, the system being communicatively connectable to an information space, the memory having a sentiment dictionary, the sentiment dictionary comprising:
a plurality of adjectives,
a plurality of group contexts, each group context having at least one noun,
each of the adjectives being associated with at least one respective group context, each of the adjectives being assigned a fixed value to represent an emotional sentiment for each group context that adjective is associated with such that that adjective is determined to have the assigned fixed value when that adjective is identified as describing the at least one noun of the group context,
the system receiving a search query that comprises at least one noun or name associated with the entity;
the system retrieving documents from the information space that correspond to the search query;
the system searching the retrieved documents for the adjectives in the sentiment dictionary that are within a predetermined textual distance of the group contexts of the sentiment dictionary;
the system calculating a sentiment score value for the search query, the calculating of the sentiment score value comprising:
determining a number of occurrences of the adjectives of the sentiment dictionary for each of the retrieved documents,
determining the fixed value for each of the adjectives for each of the occurrences such that the fixed value of the adjective for each occurrence is the fixed value assigned to the adjective for the group context to which the occurrence of the adjective is detected, and
adding the fixed values for the adjectives found in the retrieved documents to determine a sentiment score value.

2. The method of claim 1 wherein each of the group contexts of the sentiment dictionary is assigned a priority value, the priority value being a fixed value identifying a priority of the group context.

3. The method of claim 1 wherein the detection of the group context to which the occurrence of the adjective is performed such that if multiple context groups are determined to be applicable to a detected occurrence, the fixed value assigned to the adjective for the group context to which the occurrence of the adjective is detected is the fixed value for the group context having a highest priority relative to any other context group determined to be applicable to the occurrence.

4. The method of claim 1 further comprising:
the system splitting each of the retrieved documents into multiple documents or multiple message blocks;
classifying each of the message blocks or split multiple documents based on how closely that document or message block matches the search query; and
wherein the calculated sentiment score value for the search query is calculated such that the determined fixed value of the adjective for each occurrence is weighted based on the classification of the message block or document in which that occurrence was found.

5. The method of claim 1 wherein said at least one noun of each context group is comprised of a word, a character string, a unigram, or an n-gram.

6. The method of claim 1 further comprising determining a context identifier for the search query, the context identifier comprising a word, a character string, an expression, a unigram or an n-gram.

7. The method of claim 1 wherein the predetermined textual distance of the group contexts of the sentiment dictionary is a number of words between the adjective and the at least one noun of the context group.

8. The method of claim 1, comprising changing the sentiment dictionary as a function of the search query.

9. The method of claim 8, wherein the changing of the sentiment dictionary comprises removing adjectives associated to a group context from the sentiment dictionary if the group context of the adjective does not correspond to terms used in the search query.

10. The method of claim 8 wherein the changing of the sentiment dictionary comprises assigning fixed values to adjectives as a function of a match between the group context and the search query.

11. The method of claim 1 wherein the retrieved documents are comprised of at least one of a world wide web page, a newspaper page, speech recognized spoken text, a collection of blog entries, and a paragraph comprising a plurality of words.

12. The method of claim 1 wherein said entity is at least one of a company, a division of the company, a department, a person, a name of a concept, or a party.

13. The method of claim 1 wherein said entity has a denomination as an entity identifier.

14. The method of claim 1 wherein the sentiment score value is calculated as a function of a textual difference between occurrences of the entity in the retrieved documents and the occurrences of the adjectives.

15. The method of claim 1 further comprising building the sentiment dictionary.

* * * * *